US012589949B2

(12) United States Patent
Jeremic

(10) Patent No.: US 12,589,949 B2
(45) Date of Patent: Mar. 31, 2026

(54) RETAINING UNIT FOR RETAINING A CONTAINER AND RETAINING DEVICE AND APPARATUS COMPRISING SAID RETAINING UNIT

(71) Applicant: KOSME S.R.L. UNIPERSONALE, Roverbella (IT)

(72) Inventor: Dejan Jeremic, Maria-Anzbach (AT)

(73) Assignee: KOSME S.R.L. UNIPERSONALE, Roverbella (IT)

( * ) Notice: Subject to any disclaimer, the term of this patent is extended or adjusted under 35 U.S.C. 154(b) by 282 days.

(21) Appl. No.: 18/491,895

(22) Filed: Oct. 23, 2023

(65) Prior Publication Data

US 2024/0132302 A1      Apr. 25, 2024
US 2024/0228189 A9      Jul. 11, 2024

(30) Foreign Application Priority Data

Oct. 24, 2022     (IT) ........................ 102022000021870

(51) Int. Cl.
  *B65G 47/90*      (2006.01)
  *B25J 15/00*      (2006.01)
  *B65G 21/20*      (2006.01)
(52) U.S. Cl.
  CPC ........ *B65G 47/904* (2013.01); *B25J 15/0028* (2013.01); *B65G 21/2063* (2013.01); *B65G 2201/0244* (2013.01)
(58) Field of Classification Search
  None
  See application file for complete search history.

(56) References Cited

U.S. PATENT DOCUMENTS 4,629,389 A * 12/1986 Kontz .................. B65G 47/847
                                                  414/800
5,201,501 A *  4/1993 Fassler ................ B24B 13/0031
                                                  294/902

(Continued)

FOREIGN PATENT DOCUMENTS

DE          1482616 A1     1/1969
DE         19740891 A1     3/1999

(Continued)

OTHER PUBLICATIONS

Search Report and Wirtten Opinion of Italian Patent Application No. 10202000021870, Search Completed May 26, 2023, 6 pages.

*Primary Examiner* — William R Harp
(74) *Attorney, Agent, or Firm* — Chrisman Gallo Tochtrop LLC

(57)          ABSTRACT
A retaining unit (1) for retaining a container (4), comprising a supporting body (7), mountable on a movement unit (5), a gripping element (8) and a resting element (9) mounted on the supporting body (7), The gripping element (8) comprises a first arm (10) and a second arm (11), comprising respective gripping portions delimiting a housing (14) for the container (4), having a vertical main line of extension (15). The first arm (10) is movable between a first returned position and a first opened wide position. The resting element (9) has a resting portion (35), delimiting the housing (14), in part, and configured to make contact with a lateral surface of the container (4), is rotatably mounted on the supporting body (7) according to an axis of oscillation (36) transversal to the main line of extension (15), and can oscillate around this between multiple operating positions at each of which the resting portion (35) is positioned differently and delimits the housing (14) differently.

23 Claims, 9 Drawing Sheets

(56)          References Cited

U.S. PATENT DOCUMENTS

| | | | |
|---|---|---|---|
| 5,743,377 A | 4/1998 | Kronseder | |
| 6,073,667 A * | 6/2000 | Graffin | G01G 3/1402 |
| | | | 177/229 |
| 6,848,565 B2 | 2/2005 | Lehmann et al. | |
| 8,720,670 B2 | 5/2014 | Schulnig | |
| 9,463,591 B2 | 10/2016 | Winzinger | |
| 9,834,392 B2 | 12/2017 | Raffaini et al. | |
| 9,873,571 B2 | 1/2018 | Hahn | |
| 10,406,694 B2 | 9/2019 | Harkleroad et al. | |
| 10,850,929 B2 | 12/2020 | Ronchi | |
| 11,066,250 B2 | 7/2021 | Ronchi | |
| 11,186,443 B2 | 11/2021 | Boarin et al. | |
| 11,186,444 B2 | 11/2021 | Ronchi | |
| 11,654,580 B2 | 5/2023 | Schulnig | |
| 11,708,226 B2 | 7/2023 | Neubauer et al. | |
| 2010/0282364 A1 | 11/2010 | Balzarin | |
| 2022/0002089 A1 | 1/2022 | Begin et al. | |

FOREIGN PATENT DOCUMENTS

| | | | |
|---|---|---|---|
| DE | 10140315 A1 | 3/2003 | |
| DE | 20305988 U1 | 7/2003 | |
| DE | 102018222767 A1 | 6/2020 | |
| EP | 0023244 A1 | 2/1981 | |
| EP | 0743267 A1 | 11/1996 | |
| EP | 2159172 A1 | 3/2010 | |
| EP | 2511205 A2 | 10/2012 | |
| EP | 2774877 A1 | 9/2014 | |
| EP | 2949608 A1 | 12/2015 | |
| EP | 3109189 A1 | 12/2016 | |
| EP | 3613683 A1 | 2/2020 | |
| EP | 3816075 A1 | 5/2021 | |
| EP | 3907162 A1 | 11/2021 | |
| JP | 07097044 | 4/1995 | |
| JP | H10045250 | 2/1998 | |
| WO | 9951514 A1 | 10/1999 | |
| WO | 03/048011 A1 | 6/2003 | |
| WO | 2011083113 A1 | 7/2011 | |
| WO | 2014069359 A1 | 5/2014 | |
| WO | 2015036159 A1 | 3/2015 | |
| WO | 2017184740 A1 | 10/2017 | |
| WO | 2019082111 A1 | 5/2019 | |
| WO | 2020094804 A1 | 5/2020 | |
| WO | 2020126218 A1 | 6/2020 | |

* cited by examiner

RETAINING UNIT FOR RETAINING A CONTAINER AND RETAINING DEVICE AND APPARATUS COMPRISING SAID RETAINING UNIT

The present invention relates to a retaining unit for retaining a container, and a retaining device and apparatus comprising said retaining unit. More specifically, the present invention relates to a retaining unit which is configured to be moved by a movement unit along a movement path.

The use of retaining units is very common in industries where containers need to be moved, and the retaining of containers is a very important aspect in the production cycle.

Indeed, in some apparatuses, the container is retained by the retaining unit during the various steps that lead to the making of the finished, ready-to-sell product (for example, filling, capping and labelling).

In this apparatus, the container is, generally, first fed to the retaining unit, and the retaining unit is enabled to retain the container. Subsequently, the container is moved, by the movement of the movement unit, through one or more processing stations. More specifically, some processing stations may include: a filling station, a capping station, and a labelling station.

For this purpose, the prior art includes a number of types of retraining units that differ from each other in the number and shape of their components, in their operation and in the complexity of their assembly.

Some retaining units in the prior art comprise a gripping element which is substantially shaped like pincers and is switchable between a gripping configuration and a release configuration. In the gripping configuration, the two pincer arms are mechanically clenched together to hold the container between them. In the release configuration, on the other hand, the two pincer arms are open to allow the container to be released or inserted between them.

This type of retaining unit is very popular as it is easy to design and assemble, but it is not without flaws. In fact, the reciprocal movement of the two arms (and, therefore, the opening and closing of the pincers) must be well calibrated to prevent, on the one hand, the container from being crushed between the arms (where, in the gripping configuration, the arms exert excessive force on the container) and, on the other hand, the container from slipping out and falling out of the arms (where, in the gripping configuration, the arms exert force insufficient to retain the container). In addition, the retaining unit must ensure that the container is stable during movements.

Secondly, this type of retaining unit is usually suitable for retaining containers of only one type or of types very similar to each other: where changing the format, which is very common in the industry, it is therefore necessary to replace either the gripping elements alone or the entire retaining unit, which increases downtime and thus reduces productivity. Considering that the same apparatus is often used to process containers of significantly different shapes and sizes, alternating between different production cycles, it is easy to tell how much time can be lost due to format changes.

Various different types of retaining units are described in DE 1482616, EP 0023244, JP 07097044, EP 0743267, JP 10045250, DE 19740891, WO 9951514, DE 10140315, WO 200348011, DE 20305988, EP 2159172, WO 201183113, EP 2511205, WO 201469359, EP 2774877, WO 201536159, EP 2949608, EP 3109189, WO 2017184740, WO 201982111, EP 3613683, WO 202094804, WO 2020126218, DE 102018222767, EP 3816075 e EP 3907162.

In this context, the technical purpose of the present invention is to produce a retaining unit for retaining a container, and a retaining device and apparatus comprising said retaining unit, which at least in part offer a solution to the issues mentioned above.

More specifically, the technical purpose of the present invention is to produce a retaining unit for retaining a container which provides an alternative solution to those already known and allows containers of even significantly different shapes and/or sizes to be retained.

The technical purpose and the aims indicated above are substantially achieved by a retaining unit for retaining a container, and a retaining device and apparatus comprising said retaining unit, in accordance with the contents of the accompanying claims. Particular embodiments of the present invention are defined in the dependent claims.

Further features and the advantages of the present invention will become more apparent upon careful reading of the detailed description of several preferred, non-limiting embodiments of a retaining unit for retaining a container, and a retaining device and apparatus comprising said retaining unit, as shown in the accompanying drawings, in which.

Figure 1:
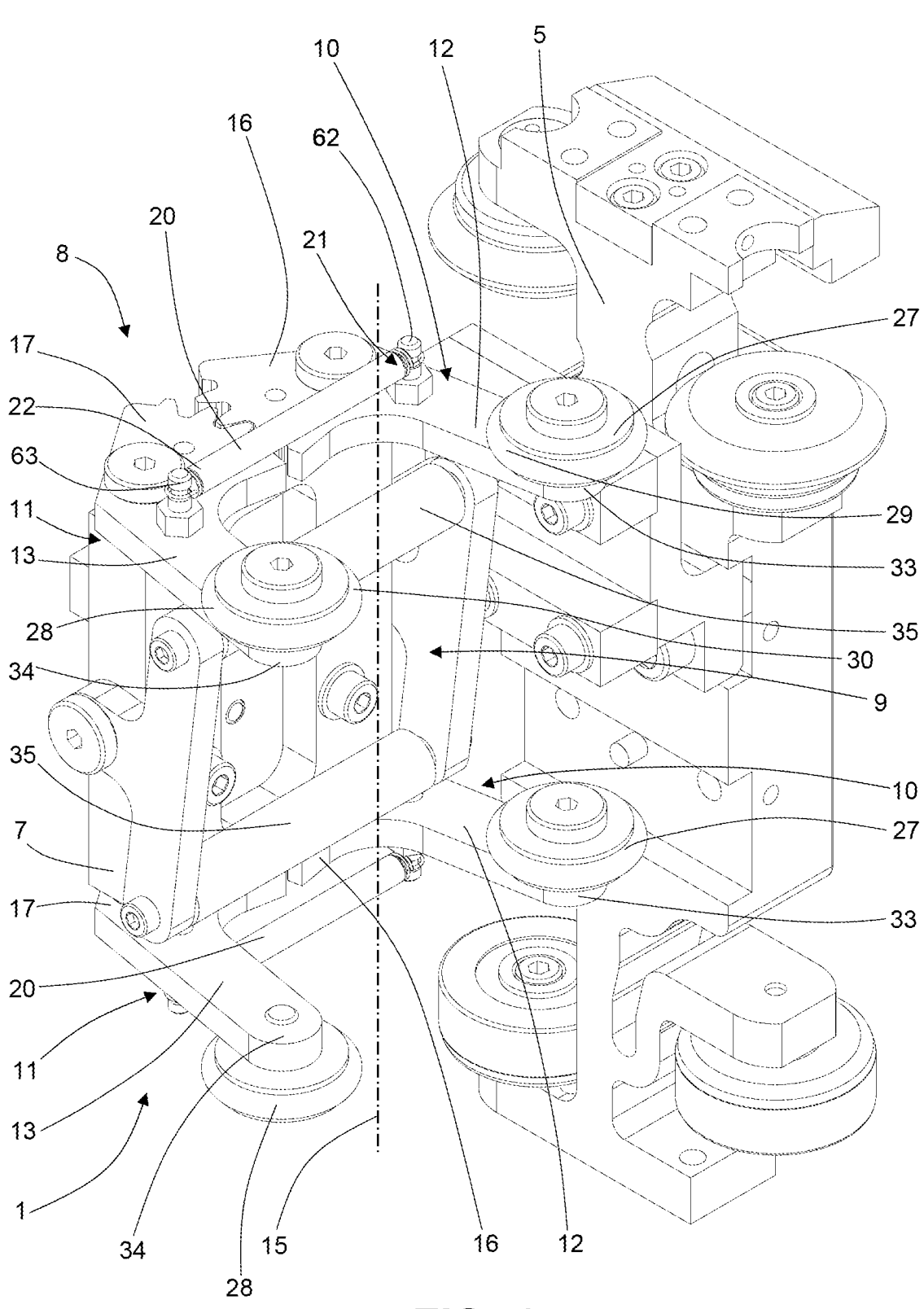
FIG. 1 shows, in a first three-quarter axonometric view, a retaining unit according to the present invention, mounted on a movement unit.

Referring to the drawings above, a complete retaining unit for retaining a container in accordance with the present invention has been assigned reference number 1, whereas a retaining device for retaining a container, comprising the retaining unit, has been assigned reference number 2 and an apparatus for moving a container, comprising the retaining unit, has been assigned reference number 3.

In the following, the retaining unit 1 will be described first, and then the retaining device 2 and the apparatus 3 comprising said retaining unit 1 will be described. More specifically, as will be seen, the retaining device 2 advantageously comprises a pair of retaining units 1 that are reciprocally movable to each other to retain and allow the positioning (and/or removal) of the container 4, whereas the apparatus 3 advantageously comprises the retaining device 2 with each retaining unit 1 that is coupled to a respective movement unit 5. The retaining unit 1 described in the present invention is indeed advantageously configured to be moved by a movement unit 5 along a movement path 6. Aspects related to the movement unit 5 and the movement of the same retaining unit 1 in the preferred embodiments will nevertheless be explained in detail below when describing the apparatus 3 of which the movement unit 5 advantageously forms part.

The retaining unit 1 first of all comprises a supporting body 7 which is configured to be mounted, in use, on the movement unit 5.

In the embodiment shown, the supporting body 7 has an overall footprint substantially analogous to that of a rectangular parallelepiped and has fastening holes into which fastening means (bolts in the accompanying drawings) can be inserted to fasten the supporting body 7 to the movement unit 5 in accordance with the description below. It should be noted that the present invention is not limited either by the characteristics of the supporting body 7, as it is possible for it to have any shape whatsoever (such as, for example, a shape different from the one described and shown in the accompanying drawings), or by the manner in which the supporting body 7 is mountable on the movement unit 5.

The retaining unit 1 also comprises at least one gripping element 8 and a resting element 9, which are mounted on the supporting body 7.

With reference to the gripping element 8, this includes both a first arm 10 and a second arm 11 which are mounted on the supporting body 7. The first arm 10, in turn, comprises a first gripping portion 12, while the second arm 11, in turn, comprises a second gripping portion 13. The first gripping portion 12 and the second gripping portion 13 delimit between them, in part, a housing 14 in which, in use, the container 4 can be received. Said housing 14 has a main line of extension 15, which is positioned vertically when, in use, the supporting body 7 is mounted on the movement unit 5 and which, in use, is advantageously parallel to a central vertical axis of the container 4.

Advantageously, in the embodiment shown, the first arm 10 also comprises, in turn, a first actuating portion 16, while the second arm 11 comprises, in turn, a second actuating portion 17, with the first actuating portion 16 and the second actuating portion 17 rigidly connected to the first gripping portion 12 and the second gripping portion 13, respectively.

The aspects described above are clearly visible in FIGS. 1 and 2. FIGS. 4 through 7 also show both first gripping portions 12 and second gripping portions 13 (of one retaining unit 1) retaining between them a container 4 of a first type and first gripping portions 12 and second gripping portions 13 (of another retaining unit 1) retaining between them a container 4 of a second type.

As regards the first arm 10, this is movable relative to the supporting body 7 and to the second arm 11 between a first returned position and a first opened wide position: the movement of the first arm 10 from the first returned position to the first opened wide position causes a widening of the housing 14, whereas the movement of the first arm 10 from the first opened wide position to the first returned position causes a narrowing of the housing 14 (where the other parts of the retaining unit 1 are in the same position, in particular the second arm 11 in the embodiments in which it is movable).

Figure 2:
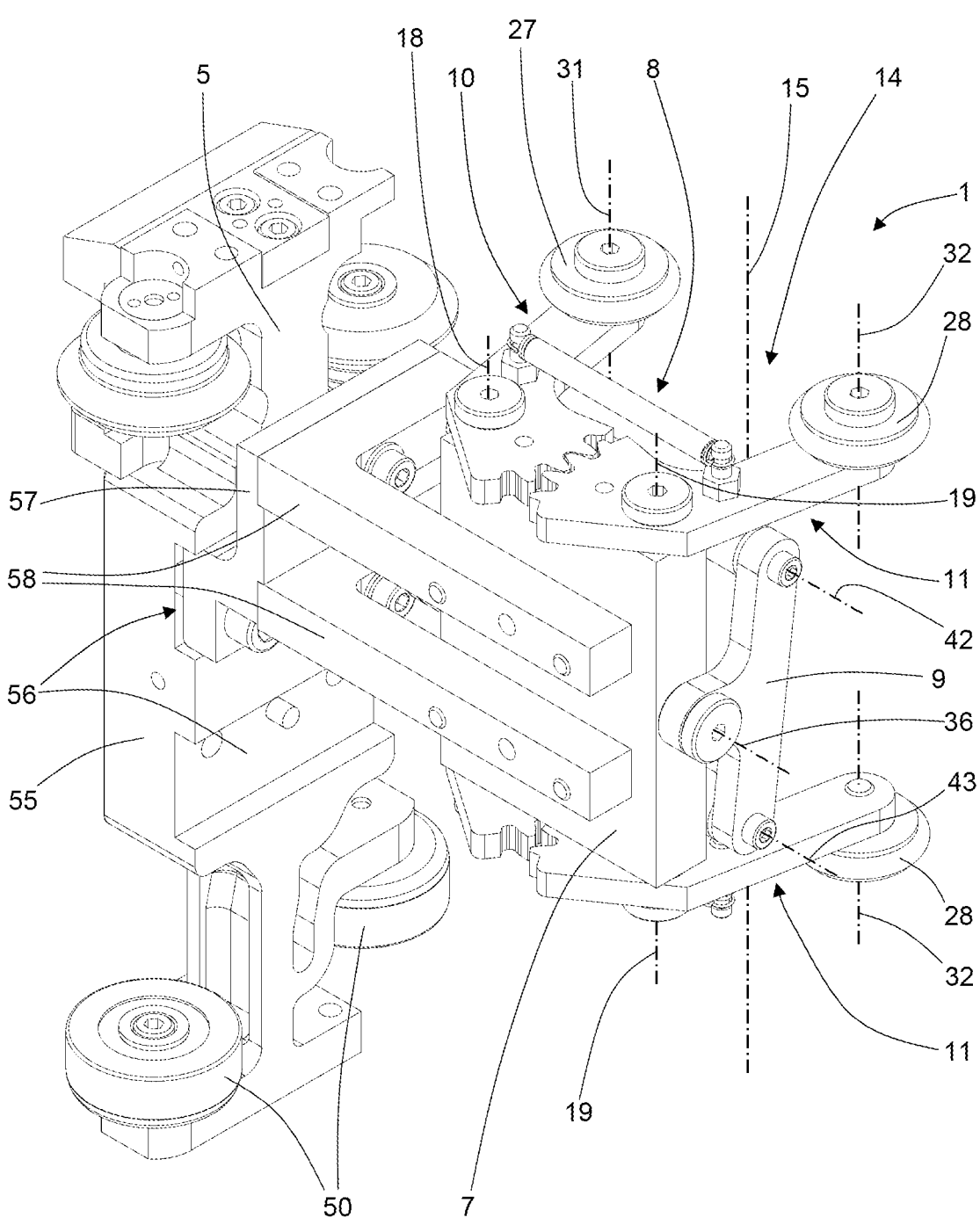
FIG. 2 shows, in a second three-quarter axonometric view from a different point of view, the retaining unit and the movement unit in FIG. 1.
Figures 3, 4:
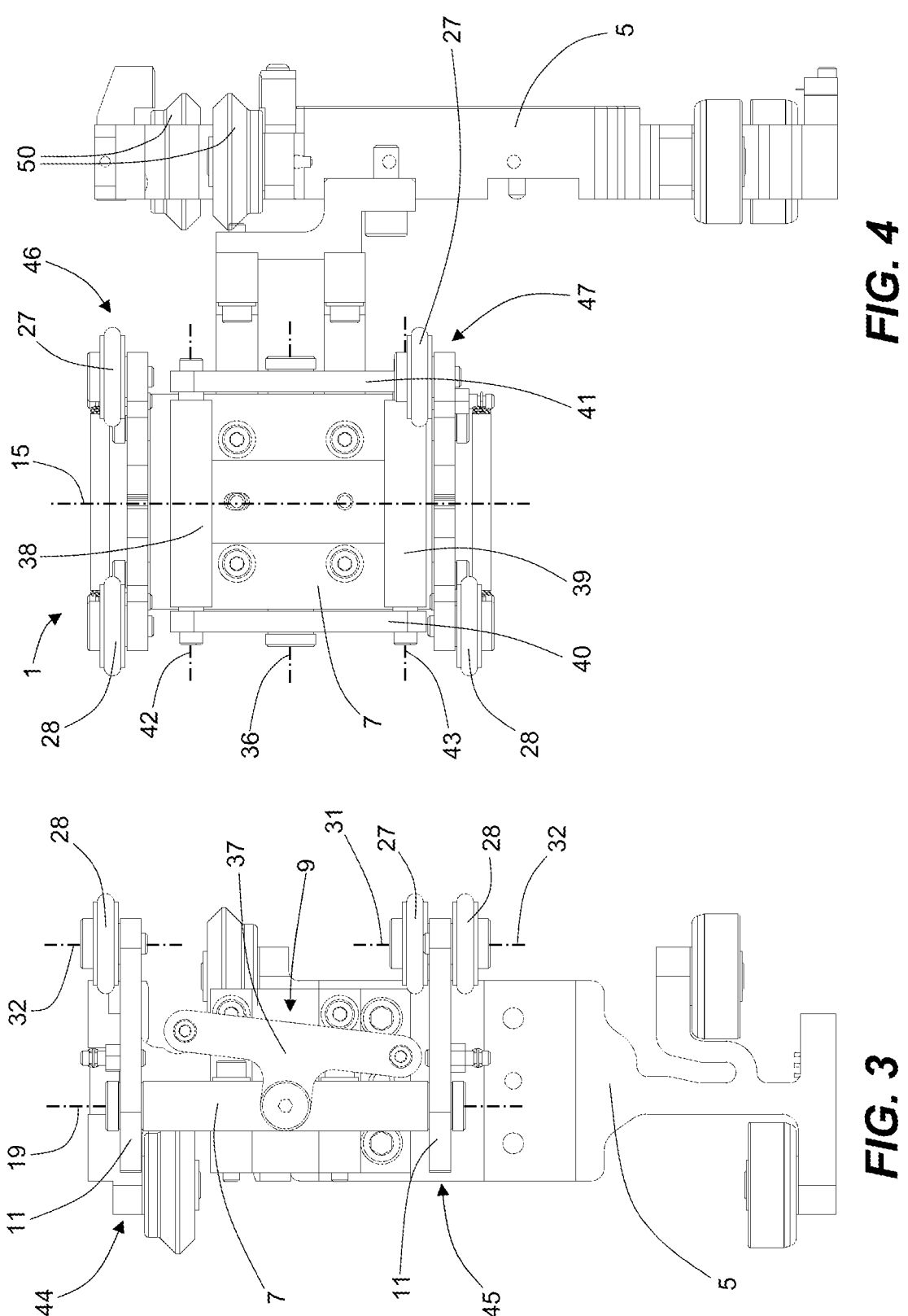
FIGS. 3 and 4 show, in a lateral view and a front view, respectively, the retaining unit and the movement unit in FIG. 2.
Figure 5:
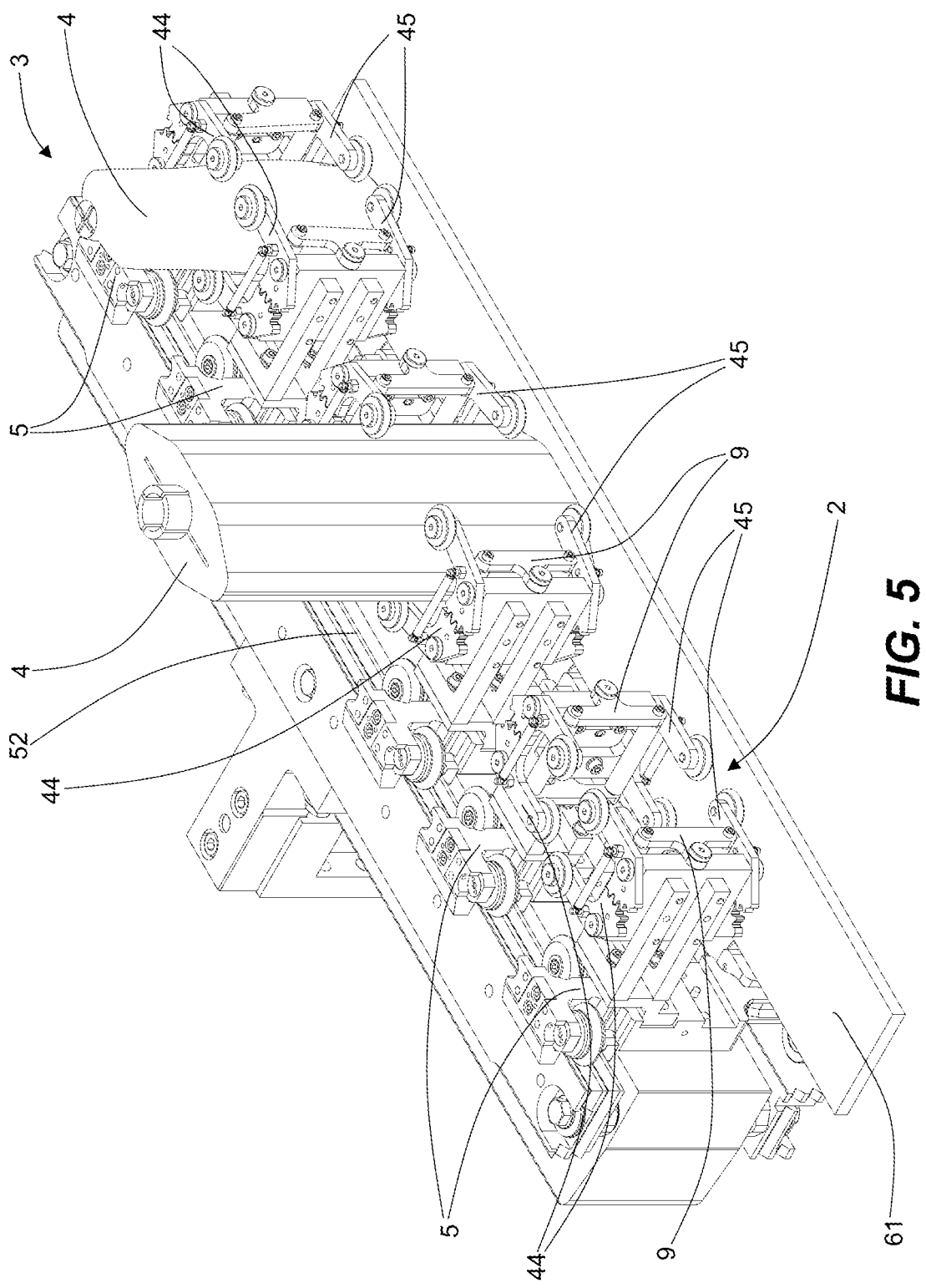
FIG. 5 shows, in a first axonometric view, a portion of an apparatus comprising the retaining unit and the movement unit in FIG. 2.
Figure 6:
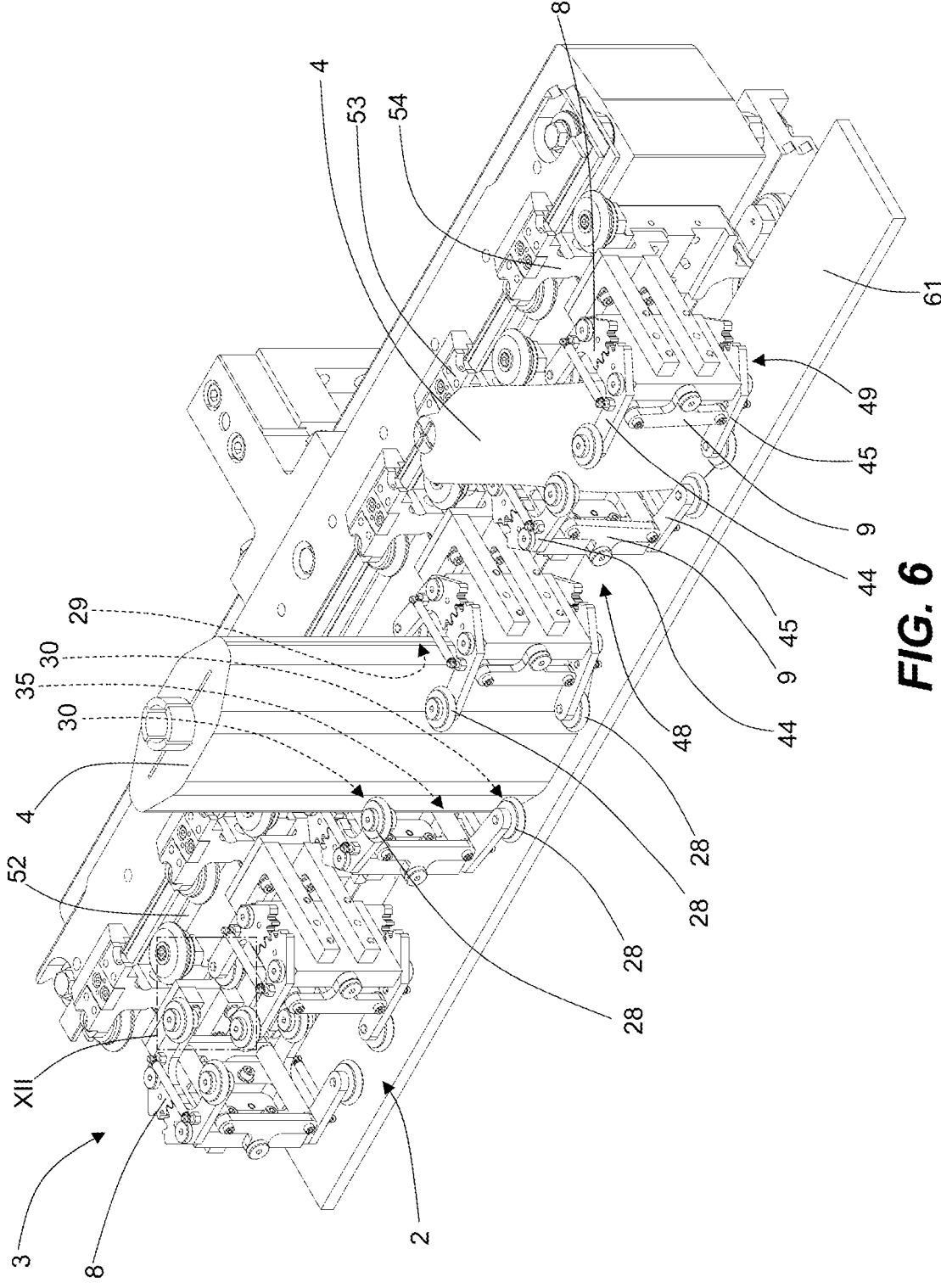
FIG. 6 shows, in a second axonometric view from a different point of view, the portion of the apparatus in FIG. 5.
Figure 7:
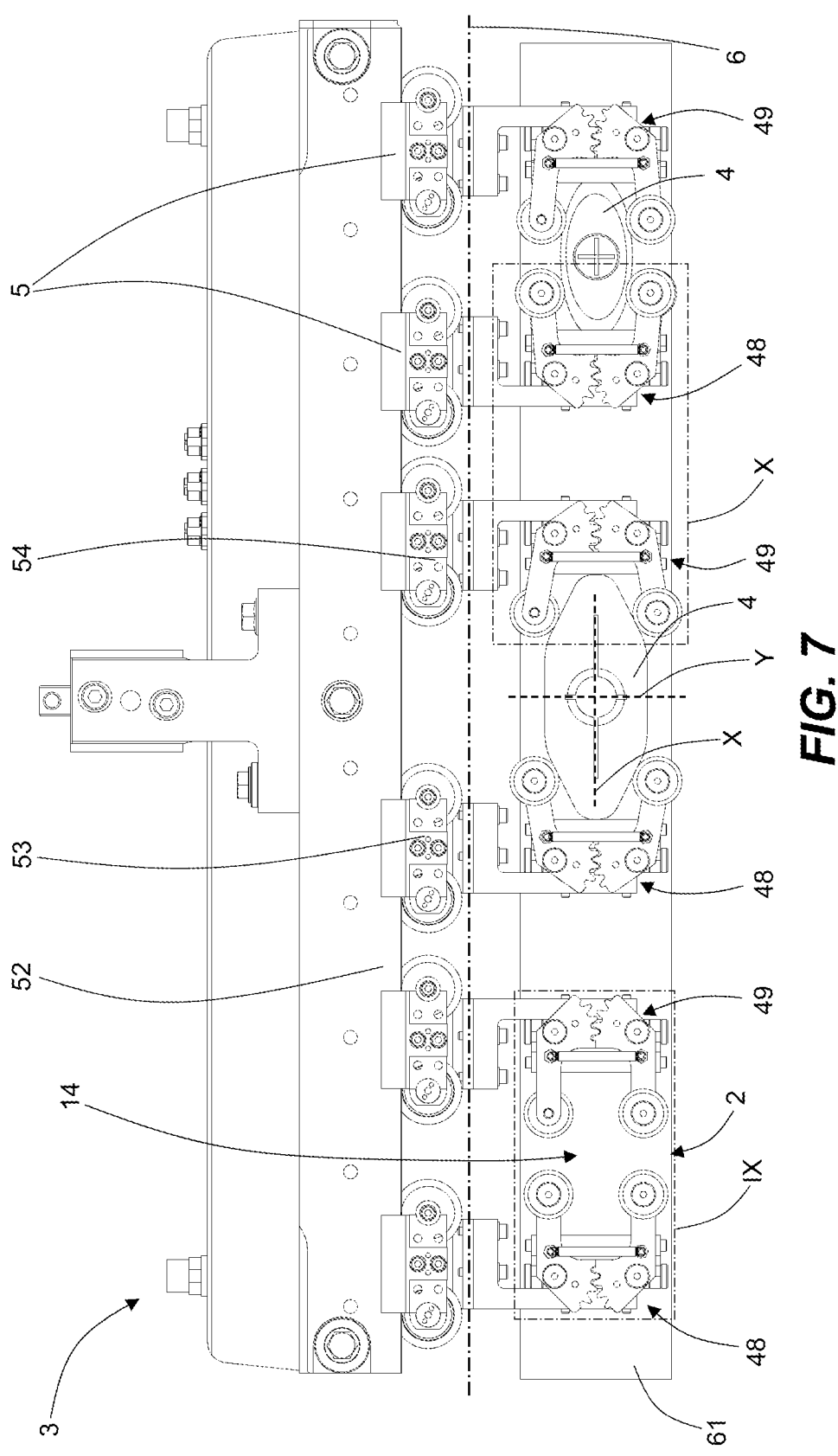
FIGS. 7 and 8 show, in a plan view and a front view, respectively, the portion of the apparatus in FIG. 6.
Figure 8:
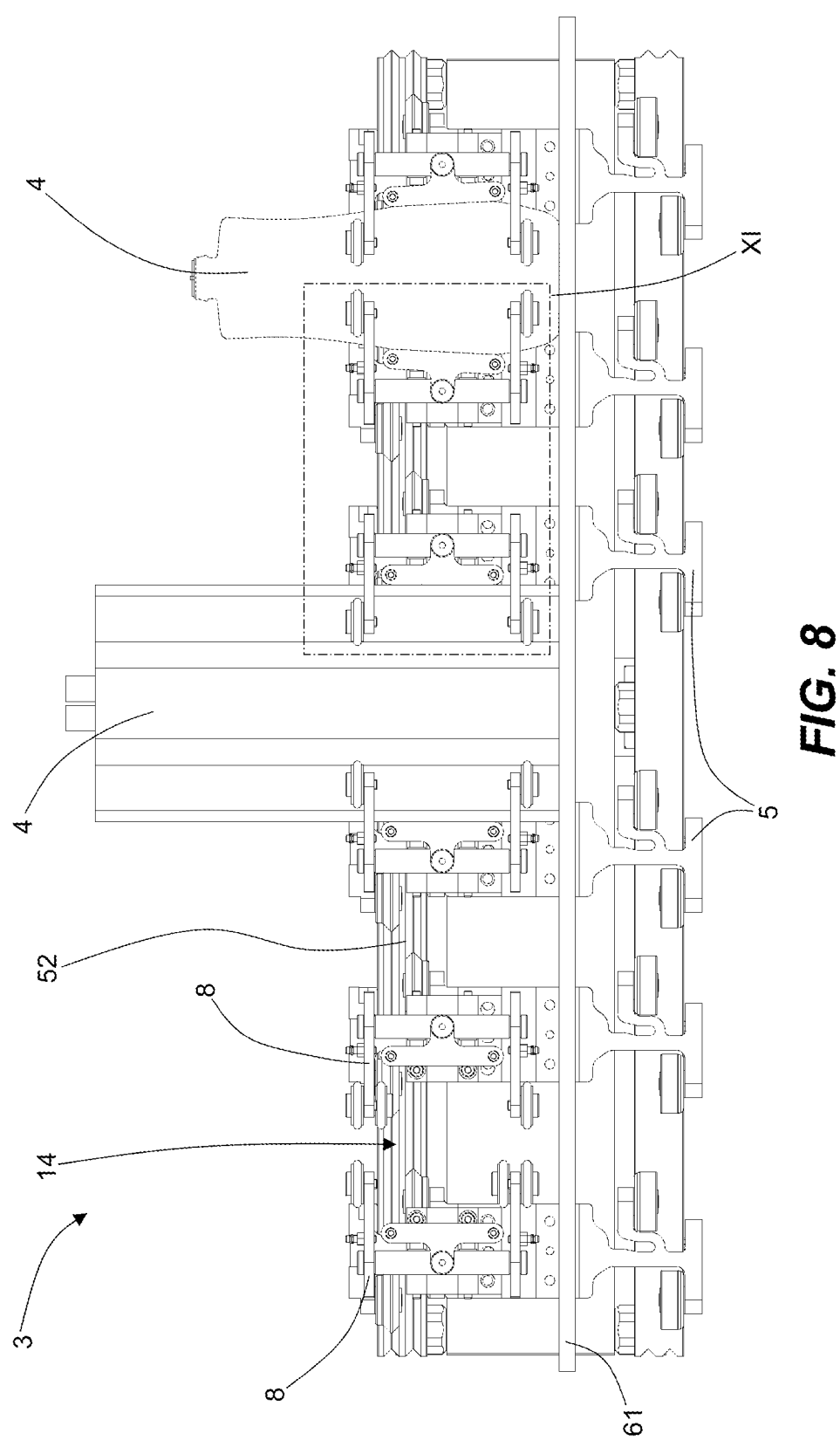

In the preferred embodiments, the first arm 10 is rotatably mounted on the supporting body 7 according to a first axis of rotation 18, which is shown, for example, in FIG. 2, and is rotatable around the first axis of rotation 18 between the first returned position and the first opened wide position.

However, it is possible that the first arm 10 may move according to a different motion than the rotation described above: for example, it is possible that the first arm 10 may translate between the first returned position and the first opened wide position. Nevertheless, it should be noted that, since in the preferred embodiments the first arm 10 is rotatable, the description below will refer only to where the first arm 10 rotates around the first axis of rotation 18 as described above. In any case, this does not exclude what is described below from applying, if technically compatible, also where the first arm 10 moves differently.

As for the second arm 11, however, in some embodiments it is fixed relative to the supporting body 7, while in other embodiments it is movable relative to the supporting body 7.

In the embodiments in which the second arm 11 is fixed relative to the supporting body 7, the second arm 11 is mounted integrally to the supporting body 7. In this case, the first arm 10 alone causes the widening and/or narrowing of the housing 14 following its rotation, about the first axis of rotation 18, between the first returned position and the first opened wide position in accordance with the description above.

In the embodiments in which the second arm 11 is movable relative to the supporting body 7, this is advantageously movable relative to the supporting body 7 between a second returned position and a second opened wide position: the movement of the second arm 11 from the second returned position to the second opened wide position causes a widening of the housing 14, whereas the movement of the second arm 11 from the second opened wide position to the second returned position causes a narrowing of the housing 14 (where the other parts of the retaining unit 1 are in the same position, in particular the first arm 10.

In the preferred embodiments, the second arm 11 is rotatably mounted on the supporting body 7 according to a second axis of rotation 19, and is rotatable around the second axis of rotation 19 between the second returned position and the second opened wide position.

Furthermore, the second axis of rotation 19 is preferably parallel to the first axis of rotation 18: in the embodiment shown, the second axis of rotation 19, just as the first axis of rotation 18, is oriented in such a way as to be advantageously positioned vertically when the supporting body 7 is mounted on the movement unit 5. Preferably, both the first axis of rotation 18 and the second axis of rotation 19 are also parallel to the main line of extension 15 of the housing 14.

Advantageously, the gripping element 8 also comprises at least one elastic element 20 which is coupled to the first arm 10 to apply a return force on the first arm 10 to return the first arm 10 towards the first returned position. For this purpose, the elastic element 20 is elastically switchable by elastic deformation between a first configuration and a plurality of second configurations. The elastic element 20 assumes the first configuration when the first arm 10 is in the returned position and one of the second configurations when the first arm 10 is moved from the returned position.

In general, it is possible for both the first configuration to correspond to a rest configuration of the elastic element 20 and the first configuration to correspond to a deformed configuration of elastic element 20. In both cases, however, the elastic element 20 is more deformed when in a second configuration than when in the first configuration. Furthermore, when the first arm 10 is in the opened wide (in other words, the position farthest from the returned position), the elastic element 20 assumes a second configuration of maximum deformation.

In some embodiments not shown in the accompanying drawings, the elastic element 20 is mounted between the first arm 10 and the supporting body 7. In the embodiments in which the second arm 11 is fixed relative to the supporting body 7, which is also not shown in the drawings, the elastic element 20 may be mounted either between the first arm 10 and the supporting body 7 or between the first arm 10 and the second arm 11.

Advantageously, the elastic element 20 comprises, or consists of, a tensile spring or a compression spring (hereafter referred to generically as a spring) that preferably develops from a first end 21 to a second end 22, as shown in the accompanying drawings.

In the embodiments in which the spring is mounted between the first arm 10 and the supporting body 7, the first end 21 is fixed to the first arm 10, whereas the second end 22 is fixed to the supporting body 7.

In the embodiments in which the spring is instead mounted between the first arm 10 and the fixed second arm 11 relative to the supporting body 7, the first end 21 is fixed to the first arm 10, whereas the second end 22 is fixed to the second arm 11.

Even in the preferred embodiments, such as the one shown in the accompanying drawings, in which the second arm 11 is also rotatably mounted on the supporting body 7, the gripping element 8 advantageously comprises the elastic element 20.

In this case, the elastic element 20 may be advantageously mounted between the first arm 10 and the second arm 11 to simultaneously apply a return force both on the first arm 10 and on the second arm 11 to return them towards the respective returned positions.

Figure 9:
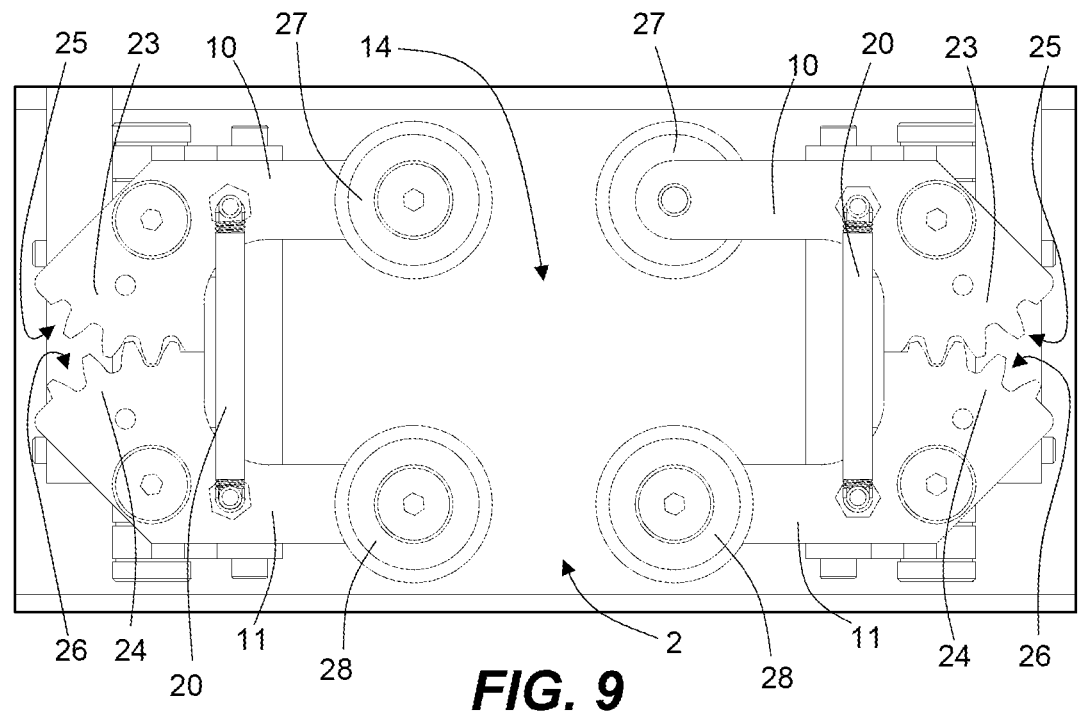
FIGS. 9 and 10 show, enlarged, details IX and X of FIG. 7, respectively.
Figure 10:
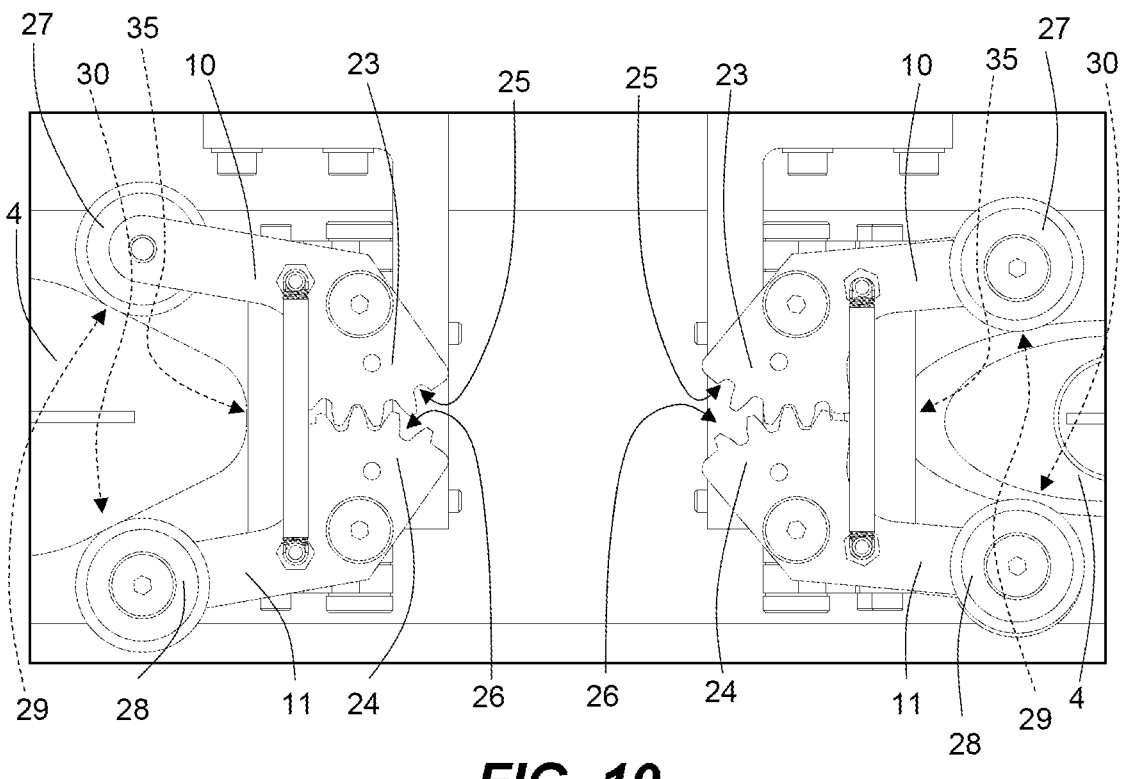

In these embodiments, the elastic element 20 is advantageously in the first configuration when the first arm 10 is in the first returned position and the second arm 11 is in the second returned position (the condition of the two retaining units 1 visible in FIG. 9), while the elastic element 20 is advantageously in the second configuration of maximum deformation when the first arm 10 is in the first returned position and the second arm 11 is in the second returned position.

Advantageously, in the embodiment shown in the accompanying drawings, the first end 21 is fixed to a first raised element of the first arm 10 (a first pin 62) and the second end 22 to a second raised element of the second arm 11 (a second pin 63).

It should be noted that in the embodiment shown in the drawings, a tensile spring is advantageously provided, which is coupled to the first arm 10 and the second arm 11 at the first gripping portion 12 and the second gripping portion 13, respectively.

However, it is still possible for the elastic element 20 to be coupled to the first arm 10 and the second arm 11 at different portions of their respective arms 10, 11: for example, it is possible for the elastic element 20 to be coupled to the first arm 10 and the second arm 11 at the first actuating portion 16 and the second actuating portion 17, respectively.

It should be noted, however, that embodiments in which both the first arm 10 and the second arm 11 are rotatable are also possible, wherein the gripping element 8 comprises a first elastic element that is coupled to the first arm 10 to apply the return force on the first arm 10 and a second elastic element that is coupled to the second arm 11 to apply the return force on the second arm 11. In this case, the first elastic element is advantageously mounted between the first arm 10 and the supporting body 7, whereas the second elastic elements is mounted between the second arm 11 and the supporting body 7. The above description of the elastic element 20 coupled with the first arm 10 should be understood as valid both for the first elastic element and the second elastic element.

In the preferred embodiments in which both the first arm 10 and the second arm 11 are rotatable relative to the supporting body 7, the first arm 10 and the second arm 11 are advantageously coupled to each other at the respective coupling zones 23, 24. The respective coupling zones 23, 24 are a first coupling zone 23, which is part of the first arm 10, and a second coupling zone 24, which is part of the second arm 11. Preferably, the first coupling zone 23 is defined by the first actuating portion 16 of the first arm 10, whereas the second coupling zone 24 is defined by the second actuating portion 17 of the second arm 11.

Advantageously, the first coupling zone 23 and the second coupling zone 24 are mechanically coupled to each other in such a way that to a rotation of the first arm 10 from the first returned position to the first opened wide position, and to a rotation of the first arm 10 from the first opened wide position to the first returned position, correspond respectively a rotation of the second arm 11 from the second returned position to the second opened wide position, and a rotation of the second arm 11 from the second opened wide position to the second returned position. Such mechanical coupling between the two arms 10, 11 thus allows the respective rotations of the first arm 10 and the second arm 11 to be coordinated with each other.

Preferably, the first coupling zone 23 and the second coupling zone 24 are geared to each other, with the first coupling zone 23 constituting a first toothed sector 25 and the second coupling zone 24 constituting a second toothed sector 26: the first toothed sector 25 and the second toothed sector 26 are centred on the first axis of rotation 18 and the second axis of rotation 19, respectively, and are geared to each other in such a way that a rotation of the first arm 10 in a first direction corresponds to a rotation of the second arm 11 in a second direction that is opposite to the first direction. In any case, the operation of a mechanical coupling with components geared to each other is already familiar to a person skilled in the field and therefore does not need to be described further.

It should also be noted that the present invention is not limited by the presence of a mechanical coupling between the first coupling zone 23 and the second coupling zone 24, nor by the type of mechanical coupling when it is present; in fact, alternative embodiments are possible in which a different type of coupling is present, for example in which the first arm 10 and the second arm 11 are motorised and electronically coupled to each other.

In the preferred embodiments, to facilitate the insertion and/or removal operations of the container 4 relative to the housing 14, the first arm 10 comprises a first wheel 27, which is rotatably coupled to the first gripping portion 12, whereas the second arm 11 comprises a second wheel 28, which is rotatably coupled to the second gripping portion 13. The first wheel 28 defines a first contact portion 29 between the first arm 10 and the container 4 and the second wheel 28 defines a second contact portion 30 between the second arm 11 and the container 4; in use, in fact, it is the first wheel 27 and the second wheel 28 that come in contact with the container 4 (they are the only parts of the first arm 10 and the second arm 11, respectively, to come into contact with the container 4). Advantageously, the first wheel 27 and the second wheel 28 are two idler wheels that can rotate freely on themselves. However, the present invention is not limited by the type of the first wheel 27 and the second wheel 28 as there are still possible embodiments in which either only the first wheel 27 or only the second wheel 28 or both caster 27, 28 are friction rollers.

In addition, the first wheel 27 is advantageously rotatably coupled with the first gripping portion 12 according to a fifth axis of rotation 31 to rotate on itself about the fifth axis of rotation 31, whereas the second wheel 28 is preferably rotatably coupled with the second gripping portion 13 according to a sixth axis of rotation 32 to rotate on itself about the sixth axis of rotation 32. In greater detail, the first wheel 27 is pinned to the first gripping portion 12 about the fifth axis of rotation 31 at a first end zone 33 of the first gripping portion 12, whereas the second wheel 28 is pinned to the second gripping portion 13 about a sixth axis of rotation 32 at a second end zone 34 of the second gripping portion 13.

Generally, in use, the two arms 10, 11 of the gripping element 8 retain the container 4 by acting on its lateral surface at areas of it located on opposite sides so as to hinder the movement of the container 4 along a line transversal to the main lines of cantilevered development of the first gripping portion 12 and the second gripping portion 13. In other words, the first arm 10 and the second arm 11 of the gripping element 8 retain the container 4 by acting on its lateral surface so as to hinder the movement of the container 4 along a line corresponding to a movement of at least one of the two arms 10, 11 towards the opened wide position. The force applied on the container 4 is advantageously generated by the elastic element 20 when it is present.

According to one of the main innovative aspects of the present invention, the retaining unit 1 also comprises the resting element 9 which has at least one resting portion 35 configured to make contact, in use, with a lateral surface of the container 4. The resting portion 35 also delimits the housing 14 for the container 4, although advantageously at a different zone from that where the gripping element 8 operates. Preferably, the resting portion 35 is arranged to act on the lateral surface of the container 4 to hinder the movement of container 4 along a line transversal, preferably perpendicular, to the line along which the first arm 10 and second arm 11 hinder the movement of container 4.

As an example, in FIGS. 5 through 8, two pairs of retaining units 1, mounted opposite each other in an apparatus 3, can be seen retaining two differently shaped containers 4, each of which comprises a resting element 9 with a lateral resting portion 35 that is in support of the respective container 4.

The resting element 9 is rotatably mounted on the supporting body 7 according to an axis of oscillation 36 transversal to the main line of extension 15 of the housing 14. Furthermore, the axis of oscillation 36 is advantageously transversal, preferably perpendicular, to the first axis of rotation 18 (and preferably also to the second axis of rotation 19). The resting element 9 can oscillate around the axis of oscillation 36, relative to the supporting body 7 and to the first arm 10 and the second arm 11, between a plurality of operating positions at each of which the resting portion 35 is positioned differently and delimits the housing 14 differently. In fact, the oscillation of the resting element 9 advantageously allows resting element 9 itself to adapt to containers 4 of different types by varying the orientation of the resting portion 35 based on the container 4. In the preferred embodiments, the oscillation of the resting element 9 is a continuous oscillation: in fact, no predetermined operating positions are provided for resting element 9. Nevertheless, embodiments are also possible in which the oscillation of the resting element 9 is a discrete oscillation: in this case, predetermined operating positions are instead provided for resting element 9.

Furthermore, the axis of oscillation 36 is advantageously oriented in such a way that it is positioned horizontally when, in use, the supporting body 7 is mounted on the movement unit 5 and therefore perpendicularly to the main axis of extension of the housing 14.

In the preferred embodiment, the resting element 9 has two resting portions 35 that are spaced apart along a line perpendicular to the axis of oscillation 36. The two resting portions 35 are configured to make contact, in use, with different parts of the lateral surface of the container 4, advantageously arranged at different elevations (one higher and one lower). In this case, each operational position that can be assumed by the resting element 9 corresponds to a different position of both resting portions 35 relative to the supporting body 7.

The resting element 9 is advantageously configured in such a way that, when in use, the supporting body 7 is mounted on the movement unit 5, in all of the operating positions of the resting element 9 the two resting portions 35 are positioned vertically one at a height lower than the axis of oscillation 36 and the other at a height higher than the axis of oscillation 36.

In other embodiments not shown, it may also be foreseen that instead of the two resting portions 35 that are spaced apart along a line perpendicular to the axis of oscillation 36, the resting element 9 has a single resting portion 35 elongated along that line. However, the design solution with two resting portions 35 spaced out is the preferred one as it allows the resting element 9 to adapt to a multitude of possible different shapes of the lateral surface of the container 4 by a simple oscillation about the axis of oscillation 36, while always maintaining a stable rest due to the two spaced out resting points.

Advantageously, in the preferred embodiment, the resting element 9 comprises a frame 37, a first roller 38 and a second roller 39, with the first roller 38 and the second roller 39 each defining one of the resting portions 35.

In the embodiment shown in the accompanying drawings, the frame 37 is rotatably mounted on the supporting body 7 according to the axis of oscillation 36 and advantageously comprises a first component 40 and a second component 41. Specifically, the first component 40 and the second component 41 are T-shaped and are rotatably mounted on the supporting body 7 at the base of the T. In addition, advantageously, the first component 40 and the second component 41 are coupled together through the first roller 38 and the second roller 39 at the other two ends of the T.

Preferably, the first roller 38 is rotatably coupled to the frame 37 according to a third axis of rotation 42 for rotating on itself, whereas the second roller 39 is rotatably coupled to the frame 37 according to a fourth axis of rotation 43 for rotating on itself. Advantageously, the third axis of rotation 42 and the fourth axis of rotation 43 are parallel to the axis of oscillation 36.

Preferably, similarly as described for the first wheel 27 and the second wheel 28, the first roller 38 and the second roller 39 are two idler roller that can rotate freely on themselves. It should be noted, however, that the present invention is not limited by the type of the first roller 38 and the second roller 39 in that embodiments are still possible in which one of the first roller 38 and the second roller 39 is an idler roller while the other is a friction roller, or in which both the first roller 38 and the second roller 39 are friction rollers.

Also preferably, as is clearly visible for example in the accompanying drawings, considering a line from the first roller 38 to the second roller 39 (perpendicular to the third axis of rotation 42 and the fourth axis of rotation 43 in the accompanying drawings), the axis of oscillation 36 is interposed between the third axis of rotation 42 and the fourth axis of rotation 43. In this way, when, in use, the supporting body 7 is mounted on the movement unit 5, the axis of oscillation 36 is horizontal and, in all of the operating positions of the resting element 9, the first roller 38 and the second roller 39 are positioned vertically one at a height lower than the axis of oscillation 36 and the other at a height higher than the axis of oscillation 36.

Figure 11:
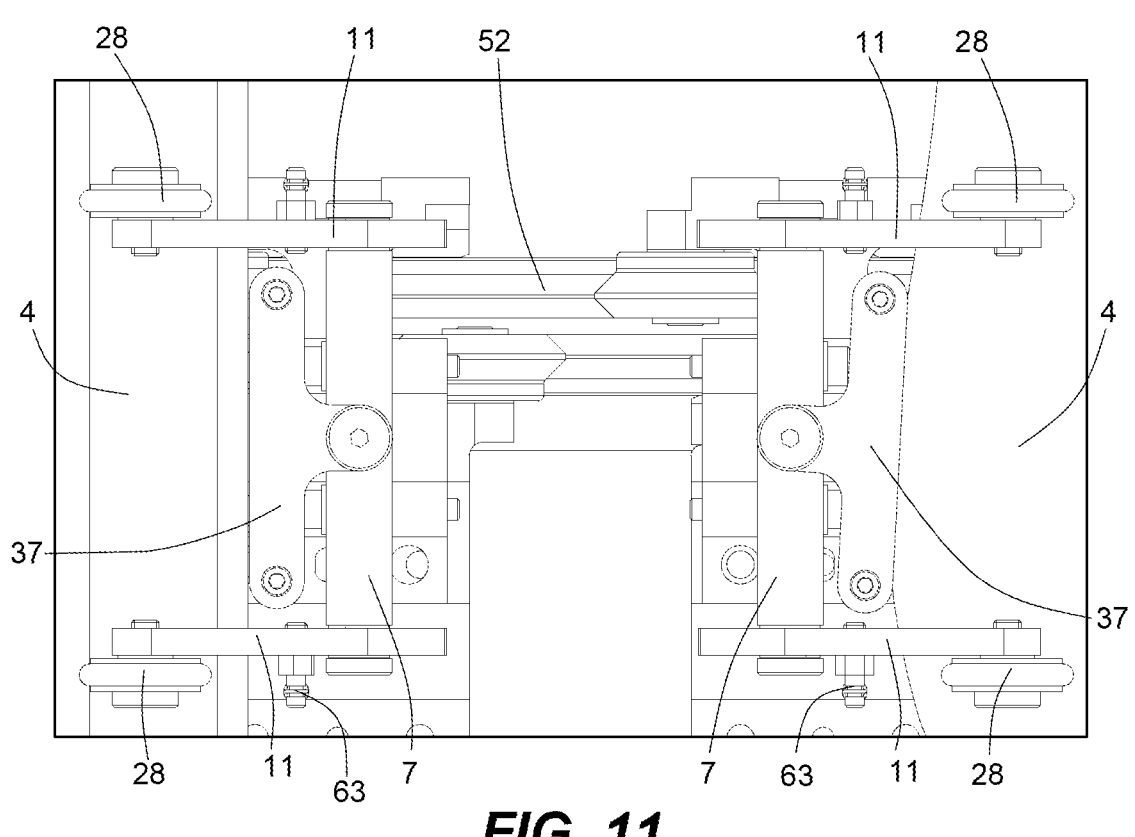
FIG. 11 shows, enlarged, detail XI of FIG. 8.

Two different operating positions that can be assumed by a resting element 9 can be seen in FIG. 11 (relative to the apparatus 3 that mounts the retaining units 1 described in the present invention). In particular, FIG. 11 shows two resting elements 9 of two different retaining units 1 whose resting portions 35 are positioned to adapt to containers 4 of different types. On the left of FIG. 11, the resting element 9 is in a position where the two resting portions 35 are essentially aligned vertically, whereas on the right the resting element 9 is rotated in such a way that one of the two resting portions 35 (the upper one) is closer to the central vertical axis of the container 4 than the other resting portion 35 (the lower one).

According to another aspect of the present invention, the retaining unit 1 comprises a pair of gripping elements 8, which are a first gripping element 44 and a second gripping element 45, respectively, both mounted on the supporting body 7. The first gripping element 44 is positioned at an upper portion 46 of the retaining unit 1, whereas the second gripping element 45 is positioned at a lower portion 47 of the retaining unit 1. It should be noted that the terms "upper portion 46" and "lower portion 47" are intended to refer to the orientation that the retaining unit 1 assumes during use, that is, once it is mounted on the movement unit 5. Nevertheless, this will be made clearer by the following description of the retaining device 2 and the apparatus 3.

In the preferred embodiments, the first gripping element 44 and the second gripping element 45 are mounted on the supporting body 7 in such a way as to have a similar orientation relative to the supporting body 7. In other words, the two gripping elements 44, 45 are essentially aligned vertically and the respective first gripping portions 12 and second gripping portions 13, extend in the same line and in the same direction. Furthermore, preferably, the resting element 9 is mounted on the supporting body 7 and is interposed between the first gripping element 44 and the second gripping element 45. This is clearly visible in FIG. 3 in particular.

Advantageously, the first arm 10 and the second arm 11 of the first gripping element 44 and the first arm 10 and the second arm 11 of the second gripping element 45, together with the resting element 9, jointly delimit the housing 14 in which the container 4 can be received.

Furthermore, in the preferred embodiments, the first axis of rotation 18 about which the first arm 10 of the first gripping element 44 rotates is parallel, and advantageously coincides with, the first axis of rotation 18 about which the first arm 10 of the second gripping element 45 rotates. Likewise, preferably, the second axis of rotation 19 about which the second arm 11 of the first gripping element 44 rotates is parallel, and advantageously coincides with, the second axis of rotation 19 about which the second arm 11 of the second gripping element 45 rotates.

We now proceed to describe the retaining device 2 for retaining a container 4.

Said retaining device 2 comprises a pair of retaining units 1, which are respectively a first retaining unit 48 and a second retaining unit 49, each of which is a retaining unit 1 of the type described above.

Furthermore, the first arm 10 and the second arm 11 of the first retaining unit 48 are positioned with the respective first gripping portion 12 and second gripping portion 13 extending cantilevered towards the second retaining unit 49, whereas the first arm 10 and the second arm 11 of the second retaining unit 49 are positioned with the respective first gripping portion 12 and second gripping portion 13 extending cantilevered towards the first retaining unit 48. As can be clearly seen from FIGS. 5 and 6, the resting element 9 of the first retaining unit 48, and more specifically its resting portion(s) 35, faces the second retaining unit 49, whereas the resting element 9 of the second retaining unit 49, and more specifically its resting portion(s) 35, faces the first retaining unit 48.

In the embodiment shown, the first retaining unit 48 and the second retaining unit 49 are reciprocally movable between a non-operative and an operative configuration. When the first retaining unit 48 and the second retaining unit 49 are in the non-operating configuration, the first retaining unit 48 and the second retaining unit 49 are spaced apart to allow the insertion and/or removal of the container 4 between them. When the first retaining unit 48 and the second retaining unit 49 are in the operating configuration on the other hand, the first retaining unit 48 and the second retaining unit 49 are near each other to jointly retain the container 4. When they are in the operating configuration, the first retaining unit 48 and the second retaining unit 49 of the retaining device 2 jointly delimit a single housing 14 in which to house the container 4.

The movement between the operating configuration and the non-operating configuration advantageously occurs on a line that connects the resting element 9 of the first retaining unit 48 to the resting element 9 of the second retaining unit 49 in such a way that the first retaining unit 48 and the second retaining unit 49 have the same reciprocal orientation in both configurations. In FIGS. 5 to 8, three retaining devices 2 can be seen with their respective first retaining unit 48 and second retaining unit 49, which are in the operating configuration. As for the retaining device 2 that is placed further to the left in these drawings, it is shown to be empty, without any container 4 in the housing 14. As regards the other two retaining devices 2 shown (the one placed in the middle in the drawings, and the one placed further to the right in the figures), these retain two containers 4 of different types, a container 4 of a first type and a container 4 of a second type, respectively.

As can also be seen in FIGS. 5 through 8, the actual size of the housing 14 is determined by the presence or absence of the container 4, as well as the shape and size of the container 4 itself.

Indeed, especially in the embodiment shown, it is the presence of the container 4 in the housing 14 that determines the position assumed by the movable arms 10, 11 and the resting element 9.

Furthermore, in the preferred embodiment, the position assumed by the movable arms 10, 11 and the resting element 9 is determined by the interaction of the retaining unit 1 with the container 4. In greater detail, from a situation in which the first retaining unit 48 and the second retaining unit 49 are in the non-operating configuration, and the container 4 is interposed between the end zones 33, 34 of the first gripping portions 12 of the first arms 10 and the second gripping portions 13 of the second arms 11. Subsequently, following the beginning of the reciprocal moving together of the first retaining unit 48 and the second retaining unit 49, the first wheels 27 and the second wheels 28 make contact with the surface of container 4. As the retaining units 48, 49 continue to reciprocally move together, the first rollers 27 and the second rollers 28 roll on the surface of the container 4 and, due to the reaction applied by it, cause the first arms 10 and the second arms 11 to open out from their respective returned positions towards their respective opened wide positions. As the continue to move together, at some point (in proximity to the operating configuration) the surface of the container 4 also makes contact with at least one of the resting portions 35 of each resting element 9. The further movement until the operating configuration is reached causes, if necessary, the resting elements 9 to rotate about the axis of oscillation 36 until the lateral surface of the container 4 makes contact with both resting portions 35 of each.

We now proceed to describe the apparatus 3 for moving a container 4 as described in the present invention. This firstly comprises a guide 52, which defines a movement path (6) along which a loading station, an unloading station are identifiable. Along the movement path (6), an unloading station and a conveying stretch which is between the loading station and the unloading station is also identifiable. It should be noted that the present invention is not limited to an apparatus 3 along whose movement path 6 only one loading station and one unloading station are identifiable. Indeed, it is possible for a plurality of loading stations and a single unloading station, or a single loading station and a plurality of unloading stations, or a plurality of loading stations and a plurality of unloading stations to be identifiable along the movement route 6. For example, where both multiple loading stations and multiple unloading stations are identifiable, it is possible for the loading stations and the unloading stations to be equal in number to each other, and for each of them to carry out the loading (for the loading stations) and unloading (for the unloading stations), respectively, of a respective type of container 4: in these embodiments, the apparatus 3 can, for example, convey a number of types of containers 4 equal to the number of loading (and unloading) stations. In another type of embodiment in which, for instance, multiple loading stations and a single unloading station are identifiable, it is possible for a respective type of container 4 to be loaded in each loading stations and for all containers 4 of the various types to be unloaded in the unloading station: in these embodiments, the apparatus 3 can, for example, convey a number of types of containers 4 equal to the number of loading stations. It should be noted that the two embodiments outlined above have been described as examples only; indeed, the present invention is not limited to those two embodiments alone.

The apparatus 3 also comprises a first movement unit 53, a second movement unit 54 and the retaining device 2 described above, with the supporting body 7 of the first retaining unit 48 which is mounted on the first movement unit 53, and with the supporting body 7 of the second retaining unit 49 which is mounted on the second movement unit 54.

Both the first movement unit 53 and the second movement unit 54 are slidably associated with the guide 52 and are movable on the guide 52. In the preferred embodiment shown in the accompanying drawings, the guide 52 is constituted of a guide with linear motors with the first movement unit 53 and the second movement unit 54 which are moved on the guide 52 along the movement path 6 by the action that is applied by the linear motors of the guide 52 on the first movement unit 53 and the second movement unit 54. Indeed, in this embodiment, the guide 52 constitutes the stator of the linear motor, whereas the first movement unit 53 and the second movement unit 54 constitute the rotor. It should be noted that the aspects closely related to the operation of a linear motor conveyor are known to a person experienced in the field and will therefore not be described in detail.

In the embodiment shown, the movement units 53, 54 comprise a movement body 55 that is slidably associated with the guide 52. Advantageously, the movement body 55 is equipped with wheels 50 and is essentially a carriage sliding on the guide 52. In addition, the movement units 5 comprise a coupling body 57, which is inserted into a seat 56 made in the movement body 55, and a fastening body 58 that is fastened to the movement body 55 and to which the supporting body 7 of the respective retaining unit 1 is fastened. In the embodiment shown, there are two fastening bodies 58, each of which is essentially L-shaped, and in which the body of the L is fastened to the respective supporting body 7 and the leg of the L is fastened to the coupling body 57.

With reference to the above described configurations which can be assumed between the two retaining units 48, 49 by means of a reciprocal movement of the first movement unit 53 and of the second movement unit 54, the first retaining unit 48 and the second retaining unit 49 are in the non-operating configuration when the first movement unit 53 and the second movement unit 54 are at the loading station and the unloading station, whereas the first retaining unit 48 and the second retaining unit 49 are in the operating configuration when the first movement unit 53 and the second movement unit 54 are at the conveying stretch.

Advantageously, in the case described above in which a plurality of loading stations are identifiable, the first retaining unit 48 and the second retaining unit 49 are in the non-operative configuration only at the loading station where it is foreseen that they will receive the container 4. In other words, at each loading station, the retaining units 48, 49 that are reciprocally in the non-operative configuration are those configured to receive the container 4 present at that loading station.

Similarly, this is also applies in the case where more than one unloading station is identifiable.

Advantageously, either at the loading station or between the loading station and the conveying stretch, a first transitional section of the movement path 6 is present. When the first movement unit 53 and the second movement unit 54 are in the first provisional stretch, the first retaining unit 48 and the second retaining unit 49 move reciprocally among each other to assume the operative configuration from the non-operative configuration is such a way as to cause the stable insertion of the container 4 into the housing 14. Also advantageously, either at the unloading station or between the conveying stretch and the unloading station, a second transitional section of the movement path 6 is present. When the first movement unit 53 and the second movement unit 54 are in the second provisional stretch, the first retaining unit 48 and the second retaining unit 49 move reciprocally among each other to assume the operative configuration from the non-operative configuration is such a way as to allow the unloading of the container 4. Finally, when the first movement unit 53 and the second movement unit 54 are in the conveying stretch, the gripping elements 8 of the first retaining unit 48 and the gripping elements 8 of the second retaining unit 49 jointly define the housing 14 and obstruct a movement of said container 4 horizontally and perpendicularly to the movement path, whereas the resting element 9 of the first retaining unit 48 and the resting element 9 of the second retaining unit 49 obstruct a movement of the container 4 parallel to the movement path 6. In particular, the gripping elements 8 of the two retaining units 48, 49 advantageously obstruct the movement of the container 4 along a second Y line, whereas the resting elements 9 of the two retaining units 48, 49 obstruct the movement of the container 4 along a first X line, with the first X line and the second Y line being perpendicular to each other. In other words, the gripping elements 8 of the two retaining units 48, 49 and the resting elements 9 of the two retaining units 48, 49 obstruct the movements of the container 4 along lines perpendicular to each other. In more detail, with reference to FIG. 7, the first X line is a horizontal line in the plane of the page (and parallel to the movement path 6), whereas the second Y line is a vertical line in the plane of the page (and perpendicular to the movement path 6), with both the X, Y lines being identified with respective dashed lines.

Advantageously, the apparatus 3 also comprises a resting surface 61 which extends between the loading station and the unloading station parallel to the movement path 6. In said embodiments, the main line of extension 15 of the housing 14 is advantageously perpendicular to resting surface 61.

Furthermore, said resting surface 61 is preferably configured to support the container 4 underneath during the movement of the first movement unit 53 and of the second movement unit 54 along the movement path 6. The containers 4, therefore, during their movement along the movement path 6, are shuffled onto the resting surface 61 so as to prevent containers 4 from falling downward during said movement.

Figure 12:
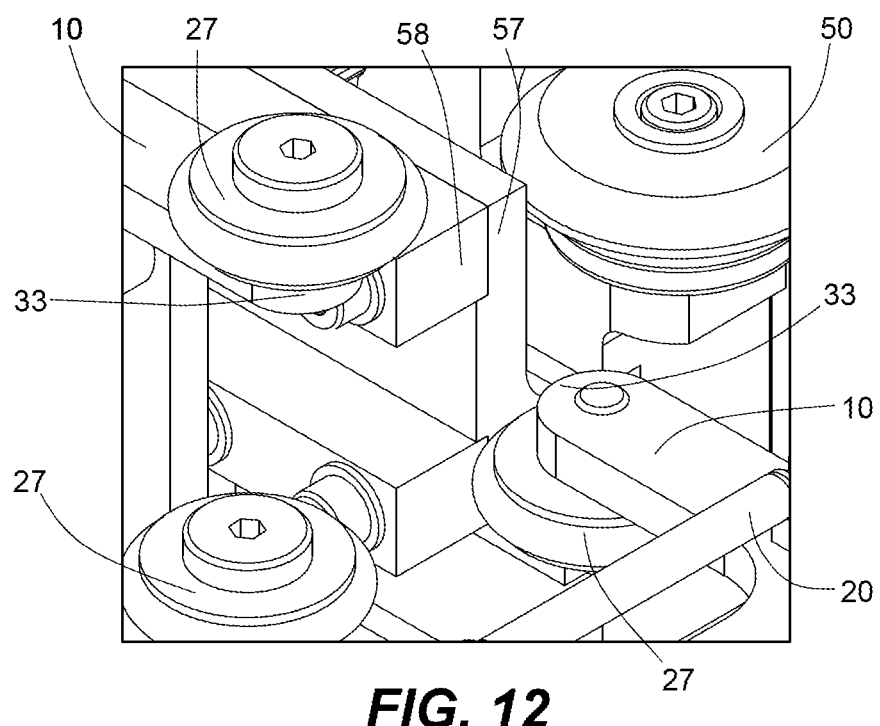
FIG. 12 shows, enlarged, detail XII of FIG. 6.

Referring to the apparatus 3 described in the present invention and, in particular, to what can be seen in the accompanying drawings, it should finally be noted that, although the two retaining units 48, 49 that form part of the same retaining device 2 can be made to mirror each other, in some embodiments it may be advantageous for the wheels mounted on two gripping portions facing each other to be vertically offset from each other: one of the two wheels is placed above the respective gripping portion while the other of the two wheels is placed below the respective gripping portion. Said aspect is clearly visible in detail in FIG. 12. It should be noted that the terms "above" and "below" are intended to refer to the positioning of the wheels in consideration of the orientation that the respective retaining unit 48, 49 assumes during use, that is, once it is mounted on the movement unit 53, 54. Said reciprocal arrangement of the wheels is indeed advantageous in avoiding collisions between the two wheels in the event that the movement path 6 along which the movement units 53, 54 move has radii of curvature such that the wheels move too close together.

In the case shown in the accompanying drawings, the offset-arranged wheels are those mounted on the gripping portions nearest the movement units 53, 54 because it is envisaged that in the curved stretches of the guide 52 the movement units 53, 54 will move within the curve.

Otherwise, if the envisaged solutions wherein, in the curved stretches of the guide 52, the movement units 5 move outside the curve, the wheels that should be arranged to be offset are those mounted on the gripping portions farthest from the movement units 53, 54.

Finally, in the case of guides 52 that define both curved stretches in which the movement units 53, 54 move outside the curve and curved sections in which the movement units 53, 54 move inside the curve, all of the opposing wheels could be arranged to be offset.

The present invention offers significant advantages.

Indeed, the present invention makes it possible to produce a retaining unit for retaining a container which provides an alternative solution to those already known and allows containers of even significantly different shapes and/or sizes to be retained.

Finally, it is worth noting that the present invention is relatively easy to make and that the cost associated with its implementation is also not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. A retaining device for retaining a container, comprising a pair of retaining units, respectively a first retaining unit and a second retaining unit, each of the pair of retaining units comprising a supporting body, at least one gripping element and a resting element, the at least one gripping element and the resting element being mounted on the supporting body, wherein:

the supporting body is configured to be mounted, in use, on a respective movement unit configured for moving the retaining unit along a movement path;

the at least one gripping element comprises a first arm and a second arm, the first arm comprising a first gripping portion and the second arm comprising a second gripping portion, the first gripping portion and the second gripping portion delimiting between them, in part, a housing in which, in use, said container can be received;

at least the first arm is mounted on the supporting body and is movable relative to the supporting body and to the second arm between a first returned position and a first opened wide position, the movement of the first arm from the first returned position to the first opened wide position causing a widening of the housing;

the resting element has at least one resting portion which also partly delimits the housing and which is configured to make contact, in use, with a lateral surface of the container;

the housing has a main line of extension which is positioned vertically when, in use, the supporting body is mounted on the respective movement unit; and the resting element is rotatably mounted on the supporting body according to an axis of oscillation transversal to the main line of extension of the housing, and can oscillate relative to the supporting body and to the first arm and the second arm around the axis of oscillation between a plurality of operating positions at each of which the resting portion is positioned differently and delimits the housing differently;

wherein moreover:

the first arm and the second arm of the first retaining unit are positioned with the respective first gripping portion and second gripping portion extending cantilevered towards the second retaining unit;

the first arm and the second arm of the second retaining unit are positioned with the respective first gripping portion and second gripping portion extending cantilevered towards the first retaining unit;

the resting element of the first retaining unit faces the second retaining unit;

the resting element of the second retaining unit faces the first retaining unit;

the first retaining unit and the second retaining unit are movable relative to each other between a non-operating configuration, in which the first retaining unit and the second retaining unit are spaced apart to allow in use positioning and/or removal of the container between them, and an operating configuration in which the first retaining unit and the second retaining unit are near each other to jointly retain, in use, the container.

2. The retaining device according to claim 1, wherein the resting element has two resting portions spaced apart along a line perpendicular to the axis of oscillation, the two resting portions being configured to make contact, in use, with different parts of the lateral surface of the container, and wherein at each operating position corresponds a different position of the two resting portions relative to the supporting body.

3. The retaining device according to claim 2, wherein, when, in use, the supporting body is mounted on the respective movement unit, in all of the operating positions of the resting element the two resting portions are positioned vertically one at a height lower than the axis of oscillation and the other at a height higher than the axis of oscillation.

4. The retaining device according to claim 2, wherein the resting element comprises a frame, a first roller and a second roller, the first roller being rotatably coupled to the frame according to a one axis of rotation and the second roller being rotatably coupled to the frame according to another axis of rotation, wherein the third one axis of rotation and the another axis of rotation are parallel to the axis of oscillation, and wherein the first roller and the second roller each define one of the resting portions.

5. The retaining device according to claim 1, wherein the axis of oscillation is oriented in such a way that it is positioned horizontally when, in use, the supporting body is mounted on the respective movement unit.

6. The retaining device according to claim 1, wherein the at least one gripping element also comprises at least one elastic element which is coupled to the first arm to apply a return force on the first arm to return said first arm towards the first returned position.

7. The retaining device according to claim 6, wherein the second arm is rotatably mounted on the supporting body according to a second axis of rotation transversal to the axis of oscillation, and wherein the second arm is rotatable around the second axis of rotation between a second returned position and a second opened wide position, the rotation of the second arm from the second returned position to the second opened wide position causing widening of the housing, and wherein the at least one elastic element is mounted between the first arm and the second arm to apply a return force on the first arm and on the second arm to return the first arm and the second arm towards the respective returned positions.

8. The retaining device according to claim 1, wherein first arm is rotatably mounted on the supporting body according to a first axis of rotation, and wherein the first arm is rotatable around the first axis of rotation between the first returned position and the first opened wide position, the rotation of the first arm from the first returned position to the first opened wide position causing widening of the housing, and wherein the axis of oscillation is transversal to the first axis of rotation.

9. The retaining device according to claim 8, wherein the first axis of rotation is oriented in such a way as to be positioned vertically when, in use, the supporting body is mounted on the respective movement unit.

10. The retaining device according to claim 8, wherein the second arm is rotatably mounted on the supporting body according to a second axis of rotation transversal to the axis of oscillation, and wherein the second arm is rotatable around the second axis of rotation between a second returned position and a second opened wide position, the rotation of the second arm from the second returned position to the second opened wide position causing widening of the housing.

11. The retaining device according to claim 10, wherein the second axis of rotation is parallel to the first axis of rotation.

12. The retaining device according to claim 1, wherein the first arm and the second arm are coupled to each other at respective coupling zones, respectively a first coupling zone and a second coupling zone, the first coupling zone and the second coupling zone being mechanically coupled to each other in such a way that the rotation of the first arm from the first returned position to the first opened wide position, and vice versa, corresponds respectively to the rotation of the second arm from the second returned position to the second opened wide position, and vice versa.

13. The retaining device according to claim 1, wherein the first arm comprises a first wheel rotatably coupled to the first gripping portion, wherein the second arm comprises a second wheel rotatably coupled to the second gripping portion, the first wheel defining in use a first contact portion between the first arm and the container and the second wheel defining in use a second contact portion between the second arm and the container.

14. The retaining device according to claim 1, comprising a pair of gripping elements both mounted on the supporting body, respectively a first gripping element, positioned at an upper portion of the retaining unit, and a second gripping element, positioned at a lower portion of the retaining unit, the first gripping element and the second gripping element being mounted on the supporting body in such a way as to have a similar orientation relative to the supporting body, and also wherein the resting element is mounted on the supporting body and is interposed between the first gripping element and the second gripping element.

15. An apparatus for moving a container comprising:
    a guide which defines a movement path along which a loading station, an unloading station and a conveying stretch which is between the loading station and the unloading station are identifiable;
    a first movement unit and a second movement unit, which are slidably associated with the guide and which are movable on the guide along the movement path; and
    the retaining device according to claim 1;
wherein the supporting body of the first retaining unit is mounted on the first movement unit and the supporting body of the second retaining unit is mounted on the second movement unit, wherein the first retaining unit and the second retaining unit are movable relative to each other between the non-operating configuration and the operating configuration by means of a reciprocal movement of the first movement unit and of the second movement unit, and wherein the first retaining unit and the second retaining unit are in the non-operating configuration when the first movement unit and the second movement unit are at the loading station and the unloading station, and in the operating configuration when the first movement unit and the second movement unit are at the conveying stretch.

16. The apparatus according to claim 15, wherein when the first movement unit and the second movement unit are in the conveying stretch of the movement path, the gripping elements, respectively of the first retaining unit and of the second retaining unit, obstruct a movement of said container horizontally and perpendicularly to the movement path and wherein the resting elements, respectively of the first retaining unit and of the second retaining unit, obstruct a movement of said container parallel to the movement path.

17. The apparatus according to claim 15, also comprising a resting surface which extends between the loading station and the unloading station parallel to the movement path, said resting surface being configured, in use, to support the container underneath during the movement of the first movement unit and of the second movement unit along the movement path.

18. The apparatus according to claim 15, wherein the guide is constituted of a guide with linear motors and wherein the first movement unit and the second movement unit are moved on the guide, by the action applied by the linear motors of said guide.

19. A retaining unit for retaining a container, comprising a supporting body, at least one gripping element and a resting element, the at least one gripping element and the resting element being mounted on the supporting body, wherein:

the supporting body is configured to be mounted, in use, on a movement unit configured for moving the retaining unit along a movement path;

the at least one gripping element comprises a first arm and a second arm, the first arm comprising a first gripping portion and the second arm comprising a second gripping portion, the first gripping portion and the second gripping portion delimiting between them, in part, a housing in which, in use, said container can be received;

at least the first arm is mounted on the supporting body and is movable relative to the supporting body and to the second arm between a first returned position and a first opened wide position, the movement of the first arm from the first returned position to the first opened wide position causing a widening of the housing;

the resting element has at least one resting portion which also partly delimits the housing and which is configured to make contact, in use, with a lateral surface of the container;

the housing has a main line of extension which is positioned vertically when, in use, the supporting body is mounted on the movement unit;

the resting element is rotatably mounted on the supporting body according to an axis of oscillation transversal to the main line of extension of the housing, and can oscillate relative to the supporting body and to the first arm and the second arm around the axis of oscillation between a plurality of operating positions at each of which the resting portion is positioned differently and delimits the housing differently;

the resting element has two resting portions spaced apart along a line perpendicular to the axis of oscillation, the two resting portions being configured to make contact, in use, with different parts of the lateral surface of the container; and at each operating position corresponds a different position of the two resting portions relative to the supporting body.

20. The retaining unit according to claim 19, wherein, when, in use, the supporting body is mounted on the movement unit, in all of the operating positions of the resting element the two resting portions are positioned vertically one at a height lower than the axis of oscillation and the other at a height higher than the axis of oscillation.

21. The retaining unit according to claim 19, wherein the resting element comprises a frame, a first roller and a second roller, the first roller being rotatably coupled to the frame according to one axis of rotation and the second roller being rotatably coupled to the frame according to another axis of rotation, wherein the one axis of rotation and the another axis of rotation are parallel to the axis of oscillation, and wherein the first roller and the second roller each define one of the resting portions.

22. A retaining unit for retaining a container, comprising a supporting body, at least one gripping element and a resting element, the at least one gripping element and the resting element being mounted on the supporting body, wherein:

the supporting body is configured to be mounted, in use, on a movement unit configured for moving the retaining unit along a movement path;

the at least one gripping element comprises a first arm and a second arm, the first arm comprising a first gripping portion and the second arm comprising a second gripping portion, the first gripping portion and the second gripping portion delimiting between them, in part, a housing in which, in use, said container can be received;

at least the first arm is mounted on the supporting body and is movable relative to the supporting body and to the second arm between a first returned position and a first opened wide position, the movement of the first arm from the first returned position to the first opened wide position causing a widening of the housing;

the resting element has at least one resting portion which also partly delimits the housing and which is configured to make contact, in use, with a lateral surface of the container;

the housing has a main line of extension which is positioned vertically when, in use, the supporting body is mounted on the movement unit;

the resting element is rotatably mounted on the supporting body according to an axis of oscillation transversal to the main line of extension of the housing, and can oscillate relative to the supporting body and to the first arm and the second arm around the axis of oscillation between a plurality of operating positions at each of which the resting portion is positioned differently and delimits the housing differently;

the first arm is rotatably mounted on the supporting body according to a first axis of rotation, and wherein the first arm is rotatable around the first axis of rotation between the first returned position and the first opened wide position, the rotation of the first arm from the first returned position to the first opened wide position causing widening of the housing, and wherein the axis of oscillation is transversal to the first axis of rotation; and the first axis of rotation is oriented in such a way as to be positioned vertically when, in use, the supporting body is mounted on the movement unit.

23. A retaining unit for retaining a container, comprising a supporting body, at least one gripping element and a resting element, the at least one gripping element and the resting element being mounted on the supporting body, wherein:

the supporting body is configured to be mounted, in use, on a movement unit configured for moving the retaining unit along a movement path;

the at least one gripping element comprises a first arm and a second arm, the first arm comprising a first gripping portion and the second arm comprising a second gripping portion, the first gripping portion and the second gripping portion delimiting between them, in part, a housing in which, in use, said container can be received;

at least the first arm is mounted on the supporting body and is movable relative to the supporting body and to the second arm between a first returned position and a first opened wide position, the movement of the first arm from the first returned position to the first opened wide position causing a widening of the housing;

the resting element has at least one resting portion which also partly delimits the housing and which is configured to make contact, in use, with a lateral surface of the container;

the housing has a main line of extension which is positioned vertically when, in use, the supporting body is mounted on the movement unit;

the resting element is rotatably mounted on the supporting body according to an axis of oscillation transversal to the main line of extension of the housing, and can oscillate relative to the supporting body and to the first arm and the second arm around the axis of oscillation between a plurality of operating positions at each of which the resting portion is positioned differently and delimits the housing differently;

the retaining unit further comprises a pair of gripping elements both mounted on the supporting body, respectively a first gripping element, positioned at an upper portion of the retaining unit, and a second gripping element, positioned at a lower portion of the retaining unit, the first gripping element and the second gripping element being mounted on the supporting body in such a way as to have a similar orientation relative to the supporting body; and the resting element is mounted on the supporting body and is interposed between the first gripping element and the second gripping element.

\*　　\*　　\*　　\*　　\*